(12) United States Patent
Zhu et al.

(10) Patent No.: US 11,537,213 B2
(45) Date of Patent: Dec. 27, 2022

(54) CHARACTER RECOMMENDING METHOD AND APPARATUS, AND COMPUTER DEVICE AND STORAGE MEDIUM

(71) Applicant: Tencent Technology (Shenzhen) Company Limited, Guangdong (CN)

(72) Inventors: Shida Zhu, Shenzhen (CN); Haicheng Su, Shenzhen (CN); Yuli Cai, Shenzhen (CN); Peiran Guo, Shenzhen (CN); Li Liu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 17/337,778

(22) Filed: Jun. 3, 2021

(65) Prior Publication Data

US 2021/0294432 A1 Sep. 23, 2021

Related U.S. Application Data

(63) Continuation of application No. PCT/CN2020/096289, filed on Jun. 16, 2020.

(30) Foreign Application Priority Data

Jul. 15, 2019 (CN) .......................... 201910636592.9

(51) Int. Cl.
*G06F 3/023* (2006.01)
*G06F 8/33* (2018.01)

(52) U.S. Cl.
CPC .......... *G06F 3/0237* (2013.01); *G06F 3/0236* (2013.01); *G06F 8/33* (2013.01)

(58) Field of Classification Search
CPC ........ G06F 3/0237; G06F 3/0236; G06F 8/33; G06F 3/0346; G06F 8/427; G06F 3/0488; G06F 3/04886
See application file for complete search history.

(56) References Cited

U.S. PATENT DOCUMENTS 11,150,875 B2* 10/2021 Brockschmidt ........... G06F 8/71
2007/0234288 A1 10/2007 Lindsey et al.
(Continued)

FOREIGN PATENT DOCUMENTS

CN 108388425 A 8/2018
CN 108595165 A 9/2018

OTHER PUBLICATIONS

International Search Report and Written Opinion for priority application No. PCT/CN2020/096289 dated Sep. 21, 2020, 10p, in Chinese language.
(Continued)

*Primary Examiner* — Matthew Ell
*Assistant Examiner* — Kenny Nguyen
(74) *Attorney, Agent, or Firm* — Crowell & Moring LLP

(57) ABSTRACT

A character recommendation method and apparatus, a computer device, and a storage medium are disclosed. The method includes: converting code inputted in a code input interface into a syntax tree, the syntax tree including a plurality of nodes, a hierarchical relationship between the plurality of nodes, and location intervals of the plurality of nodes; determining, according to a cursor location in the code input interface and the syntax tree, at least one reference node corresponding to the cursor location in the syntax tree; parsing the at least one reference node, and determining a to-be-recommended target character according to a parsing result; and recommending the target character in the code input interface.

20 Claims, 8 Drawing Sheets

(56) References Cited

U.S. PATENT DOCUMENTS

| | | | |
|---|---|---|---|
| 2008/0168366 A1* | 7/2008 | Kocienda | G06F 3/04886 715/764 |
| 2009/0077091 A1* | 3/2009 | Khen | G06F 8/20 |
| 2010/0281030 A1* | 11/2010 | Kusumura | G06F 16/81 707/769 |
| 2013/0067435 A1 | 3/2013 | Huang et al. | |
| 2015/0193408 A1* | 7/2015 | Ho | G06F 16/9535 715/255 |
| 2016/0188301 A1 | 6/2016 | Zang et al. | |
| 2020/0104102 A1* | 4/2020 | Brockschmidt | G06N 3/08 |

OTHER PUBLICATIONS

English language translation of the International Search Report for priority application No. PCT/CN2020/096289 dated Sep. 21, 2020, 3p.

Concise Explanation of Relevance for International Written Opinion, 1p.

Chen, Zihan, "Develop Your Own IDE (9)" (non-official translation), http://www.cppblog.com/vczh/archive/2010/11/06/132654.html, dated Nov. 6, 2010, paragraphs 1-5, 3p, printed from the internet May 28, 2021.

Chen, Zihan, "Develop Your Own IDS (12)" (non-official translation), http://www.cppbloq.com/vczh/archive/2010/12/05/135505.html, dated Dec. 5, 2020, paragraph 1, 7p, printed from the internet May 27, 2021.

Chen, Zihan, "Develop Your Own IDE (10)" (non-official translation), http://www.cppblog.com/vczh/archive/2010/11/07/132876.html, dated Nov. 7, 2020, paragraphs 1-3, 22p, printed from the internet May 27, 2021.

Machine translation of A7, 3p.

Machine translation of A8, 7p.

Machine translation of A9, 15p.

Notification of Reasons for Refusal for corresponding application No. JP 2021-546266 dated Oct. 25, 2022, 6p, in Japanese language.

English translation of Notification of Reasons for Refusal for corresponding application No. JP 2021-546226 dated Oct. 25, 2022, 7p.

* cited by examiner

CHARACTER RECOMMENDING METHOD AND APPARATUS, AND COMPUTER DEVICE AND STORAGE MEDIUM

RELATED APPLICATION

This application is a continuation of PCT Application No. PCT/CN2020/096289, entitled "CHARACTER RECOMMENDING METHOD AND APPARATUS, AND COMPUTER DEVICE AND STORAGE MEDIUM" and filed on Jun. 16, 2020, which claims priority to Chinese Patent Application No. 201910636592.9, entitled "CHARACTER RECOMMENDATION METHOD AND APPARATUS AND STORAGE MEDIUM" filed on Jul. 15, 2019. The above applications are incorporated by reference in their entireties.

TECHNICAL FIELD

This application relates to the field of computer technologies, and in particular, to a character recommendation method and apparatus, a computer device, and a storage medium.

BACKGROUND

A computer device usually runs based on code, and implements a function corresponding to the code by running the code. However, code development needs to be implemented by a developer by using a terminal. The developer inputs characters in the terminal, and the inputted characters form code.

Currently, a touchscreen is usually disposed on a terminal, and the developer inputs a character by using a virtual keyboard provided by the terminal on the touchscreen. However, a size of the touchscreen is limited, and a size of the virtual keyboard is also limited. Therefore, a plurality of keyboard interfaces need to be set in the virtual keyboard, and different types of characters are displayed in different keyboard interfaces. The types of the characters may include English letters, numbers, operators, and the like. When a character type needs to be switched in a code writing process of the developer, the keyboard interface of the virtual keyboard needs to be switched first, and therefore, the developer can input a character of a corresponding type by using the keyboard interface undergone switching. This operation is cumbersome and time-consuming and has low input efficiency.

SUMMARY

Embodiments of this application provide a character recommendation method and apparatus, a computer device, and a storage medium, to simplify an operation, reduce input time, and improve input efficiency. The technical solutions are as follows.

According to an aspect, a character recommendation method is provided, including:

converting code received by a code input interface into a syntax tree, the syntax tree including a plurality of nodes, a hierarchical relationship between the plurality of nodes, the plurality of nodes and the hierarchical relationship between the plurality of nodes being used for indicating a syntactic structure of the code, and location intervals of the plurality of nodes, each location interval being used for indicating a location interval of a character set corresponding to a node in the code input interface;

determining, according to a cursor location in the code input interface and the syntax tree, at least one reference node corresponding to the cursor location in the syntax tree;

parsing the at least one reference node to obtain a parsing result;

determining at least one target character according to the parsing result; and recommending the at least one target character in the code input interface.

According to another aspect, a character recommendation apparatus is provided, including:

a conversion module, configured to convert code inputted in a code input interface into a syntax tree, the syntax tree including a plurality of nodes, a hierarchical relationship between the plurality of nodes, and location intervals of the plurality of nodes, the plurality of nodes and the hierarchical relationship between the plurality of nodes being used for indicating a syntactic structure of the code, and the location interval being used for indicating a location interval of a character set corresponding to a node in the code input interface;

a node determining module, configured to determine, according to a cursor location in the code input interface and the syntax tree, at least one reference node corresponding to the cursor location in the syntax tree;

a character determining module, configured to: parse the at least one reference node, and determine a to-be-recommended target character according to a parsing result; and a recommendation module, configured to recommend the target character in the code input interface.

According to another aspect, a computer device is provided, including a processor and a memory, the memory storing an instruction or a program, the instruction or the program being loaded and executed by the processor to implement the operations performed in the character recommendation method.

According to another aspect, a computer-readable storage medium is provided, storing an instruction or a program, the instruction or the program being loaded and executed by a processor to implement the operations performed in the character recommendation method.

According to another aspect, a computer program product is provided, including computer instructions, the computer instructions being stored in a computer-readable storage medium. A processor of a computer device reads the computer instructions from the computer-readable storage medium, and the processor executes the computer instructions, so that the computer device performs the operations performed in the character recommendation method.

According to the character recommendation method and apparatus, the computer device, and the storage medium provided in the embodiments of this application, code inputted in a code input interface is converted into a syntax tree, at least one reference node corresponding to a cursor location in the syntax tree is determined according to the cursor location in the code input interface and the syntax tree, the at least one reference node is parsed, a to-be-recommended target character is determined according to a parsing result, and the target character is recommended in the code input interface. As such, a target character that needs to be inputted subsequently is recommended according to currently inputted code, and a developer does not need to manually input the character. In particular, when the developer needs to switch a character type, a keyboard interface does not need to be switched, thereby facilitating code writing of the developer, simplifying operations, reducing input time, and improving input efficiency.

BRIEF DESCRIPTION OF THE DRAWINGS

To describe the technical solutions of embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make objectives, technical solutions, and advantages of this disclosure clearer, the following further describes implementations of this disclosure in detail with reference to the accompanying drawings.

Before embodiments of this disclosure are explained and described in detail, some terms involved in the embodiments of this disclosure are explained and described first.

1. Syntax tree: A syntax tree may represent a syntactic structure of code in a tree form, and the syntax tree includes a plurality of nodes, a hierarchical relationship between the plurality of nodes, and location intervals of the plurality of nodes. The syntactic structure of the code may be determined by using the hierarchical relationship between the plurality of nodes, and a location interval of a character set corresponding to the node in a code input interface is indicated by using the location intervals of the plurality of nodes.

For example, the code is as follows:

var a=1;
var b=a+1.

Figure 1:
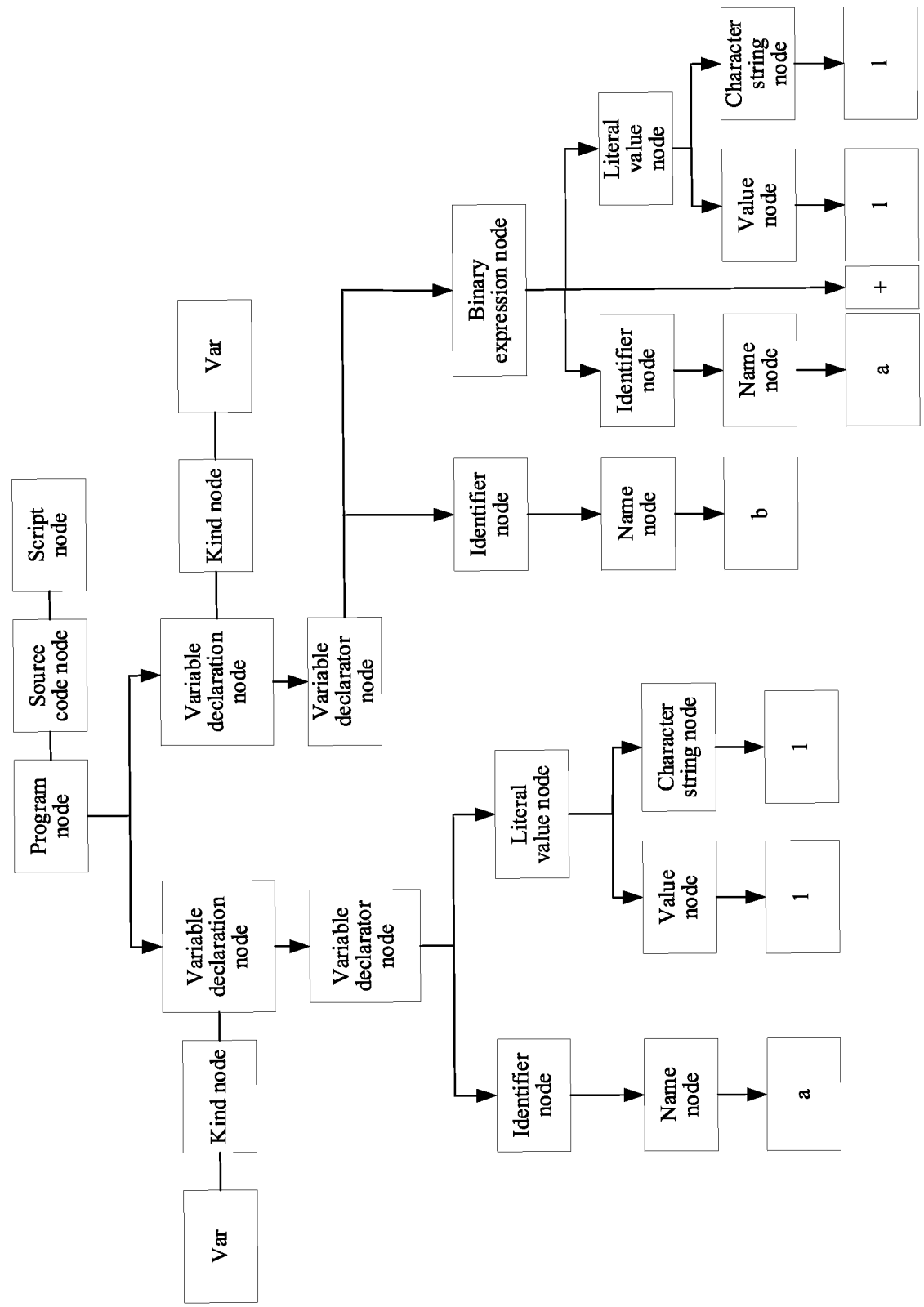
FIG. 1 is a schematic structural diagram of a syntax tree according to an embodiment of this application.

The code may be converted into a syntax tree shown in FIG. 1. A root node in the syntax tree is a script node (script), a next-layer node of the script node is a source code node (sourceType), and a next-layer node of the source code node is a program node (program).

A next layer of the program node includes two branches, respectively representing two instructions in the code.

For the first branch:

The first node at the next layer of the program node is a variable declaration node (VariableDeclaration), and the variable declaration node corresponds to a kind node (kind). A kind corresponding to the kind node is "var", and a node at a next layer of the variable declaration node is a variable declarator node (VariableDeclarator).

The first node at a next layer of the variable declarator node is an identifier node (Identifier), a node at a next layer of the identifier node is a name node (name), and a character set corresponding to the name node is "a".

The second node at the next layer of the variable declarator node is a literal value node (Literal), and a next layer of the literal value node (Literal) includes a value node (value) and a character string node (raw). A value corresponding to the literal value node is "1", and a character string corresponding to the literal value node is "1".

The first branch in the syntax tree represents a variable declaration instruction. The variable declaration instruction uses a kind "var", and the variable declarator includes an identifier and a literal value. The identifier is "a", and a value of the literal value is "1", indicating that the variable declarator is "a=1".

For the second branch:

The second node at the next layer of the program node is a variable declaration node, and the variable declaration node corresponds to a kind node. A kind corresponding to the kind node is "var", and a node at a next layer of the variable declaration node is a variable declarator node.

The first node at a next layer of the variable declarator node is an identifier node, a node at a next layer of the identifier node is a name node, and a character set corresponding to the name node is "b".

The second node at the next layer of the variable declarator node is a binary expression node (BinaryExpression). The first node at a next layer of the binary expression node is an identifier node, a node at a next layer of the identifier node is a name node, and a character set corresponding to the name node is "a". A character set corresponding to the second node at the next layer of the binary expression node is "+". The third node at the next layer of the binary expression node is a literal value node, and a next layer of the literal value node includes a value node and a character string node. A value corresponding to the literal value node is "1", and a character string corresponding to the literal value node is "1".

The second branch in the syntax tree represents a variable declaration instruction. The variable declaration instruction uses a kind "var", and the variable declarator includes an identifier and a binary expression. The identifier is "b", the binary expression includes an identifier, an operator, and a literal value, the identifier is "a", the operator is "+", and the literal value is "1", indicating that the variable declarator is "b=a+1".

"a", "b", "1", and "+" in the syntax tree may be referred to as characters. In addition, "a" and "b" are identifiers, and "+" is an operator.

In addition, the syntax tree may include an operator node, an identifier node, or another type of node.

The operator node refers to a node whose corresponding character set includes an operator. For example, the operator may be a plus sign, a minus sign, a multiplication sign, or the like. Because the code includes an operator, and the operator is used for instructing the code to perform an operation corresponding to the operator, in a process of running the code including the operator, an operation corresponding to the operator is performed.

The identifier node refers to a node whose corresponding character set is an identifier. For example, the identifier may be an English character, a number, or the like. For example, a character set corresponding to the identifier node may be "abc", "dd", or may be another identifier node. The character set corresponding to the node includes at least one character.

In addition, each node includes a location interval, and the location interval includes a start location and an end location. The start location is a location, in code, of a start character of a character set corresponding to the node, and the end location is a location, in the code, of an end character of the character set corresponding to the node.

Using the syntax tree shown in FIG. 1 as an example, when a location interval of a character set corresponding to an identifier node whose name is "b" is determined, the character set is only "b", a start location in the code is 13, and an end location in the code is 14.

An embodiment of this disclosure provides a character recommendation method to recommend a character to a developer when the developer edits code.

In an exemplarily implementation, the character recommendation method provided in this embodiment of this disclosure may be applied to a terminal. The terminal acquires code in a code input interface, generates a syntax tree according to the acquired code, parses the syntax tree, determines a to-be-recommended target character, and recommends the target character to the developer.

In another exemplarily implementation, the character recommendation method provided in this embodiment of this disclosure may be applied to an implementation environment including a terminal and a server.

Figure 2:
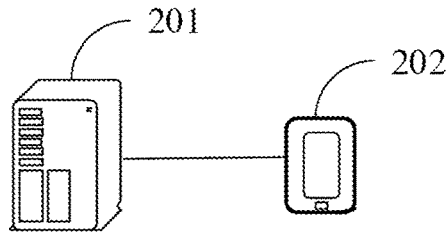
FIG. 2 is a schematic diagram of an implementation environment according to an embodiment of this disclosure.

FIG. 2 is a schematic diagram of an implementation environment according to an embodiment of this disclosure. Referring to FIG. 2, the implementation environment includes a server 201 and a terminal 202. The server 201 and the terminal 202 are connected by using a communication network.

The server 201 may be a server, or a server cluster that includes several servers, or a cloud computing service center. The terminal 202 may be a mobile phone, a tablet computer, a personal computer, or the like.

The terminal 202 acquires code inputted in a code input interface and transmits the code to the server 201. The server 201 converts the code into a syntax tree, parses the syntax tree, determines a to-be-recommended target character, and transmits the determined target character to the terminal 202, so that the terminal 202 recommends the target character to a developer.

The character recommendation method provided in this embodiment of this disclosure may be applied to a code writing scenario. The terminal provides a code input interface for a developer, and the developer can input a character in the code input interface to form code. By using the method provided in this embodiment of this disclosure, the code inputted by the developer in the code input interface is parsed, the target character can be recommended to the developer for selection, so that the target character selected by the developer is inputted in a cursor location.

Figure 3:
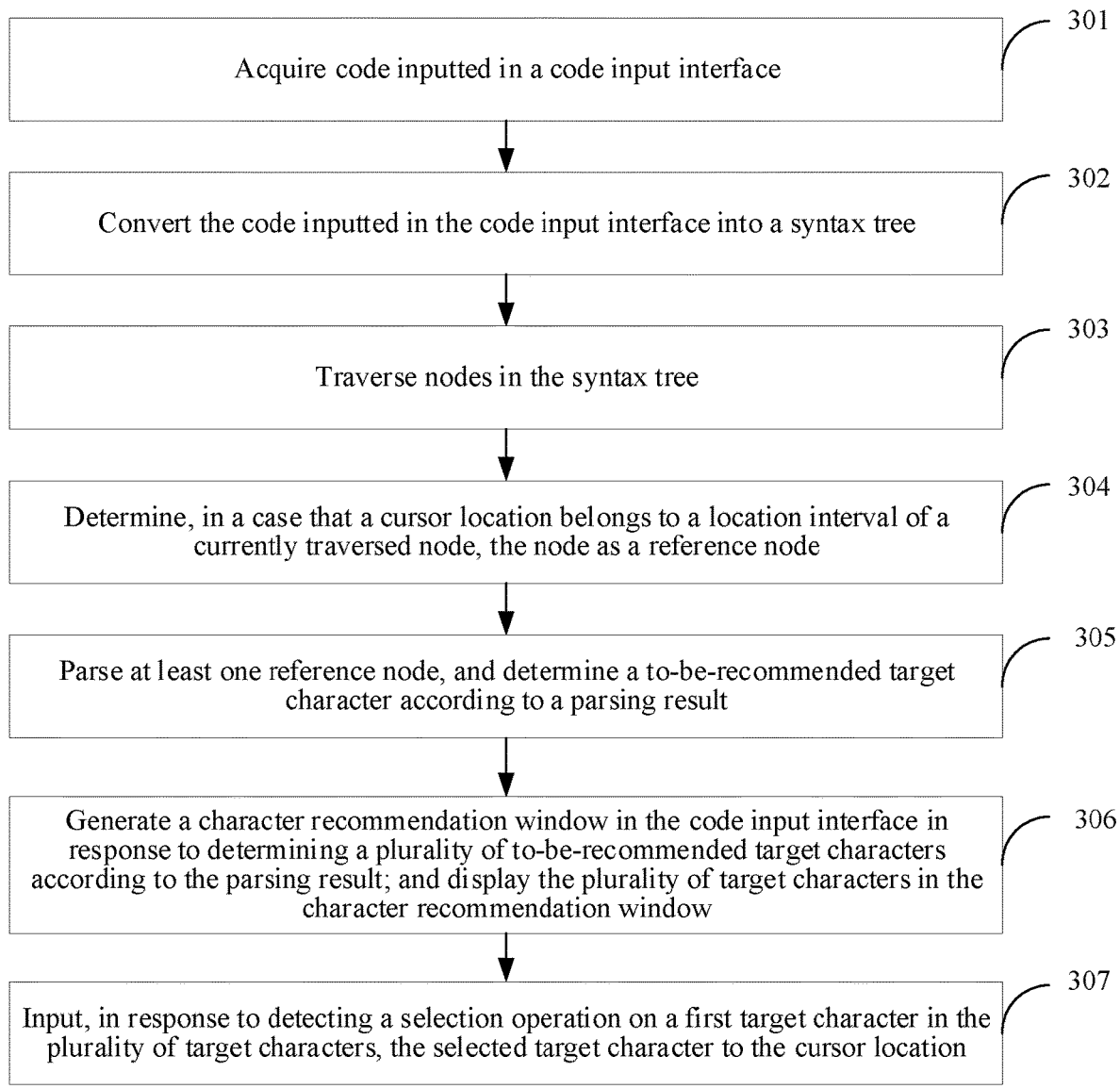
FIG. 3 is a flowchart of a character recommendation method according to an embodiment of this disclosure.

FIG. 3 is a flowchart of a character recommendation method according to an embodiment of this disclosure. Referring to FIG. 3, the method is applicable to a terminal and includes:

301. Acquire Code Inputted in a Code Input Interface.

The terminal provides a code input interface for a developer. The developer inputs characters in the code input interface provided by the terminal, and the inputted characters form code.

The code input interface may be an input interface of a specified application installed on the terminal, and the specified application may be a code editor used for inputting code. After inputting code in the code editor, the developer may run the inputted code in the code editor. When a problem occurs in code running, the developer may modify the code in the code editor according to the problem.

Alternatively, the code input interface may be an input interface of an application configured for the terminal itself, for example, the input interface may be an input interface of an application such as a memo or a notepad that is configured in the terminal.

The code input interface provided by the terminal further includes a cursor, and the cursor may be at any location in the code input interface. When the developer inputs a character, the terminal receives the character inputted by the developer, and inputs the character to a cursor location. When the developer needs to change a location of an input character, only the cursor location in the code input interface needs to be changed.

Exemplarily, in this embodiment of this disclosure, the terminal not only provides the code input interface for the developer, but also provides a virtual keyboard for the developer, and the virtual keyboard is displayed in the code input interface. When needing to input a character, the developer selects a character in the virtual keyboard. When detecting a selection operation on a character in the virtual keyboard, the terminal inputs the character to the cursor location.

A size of a display screen of the terminal is limited, and a size of the code input interface provided by the terminal is also limited. Consequently, a size of the virtual keyboard is also limited. A plurality of keyboard interfaces are set on the virtual keyboard, and different types of characters are displayed in different keyboard interfaces. The types of the characters may include English letters, numbers, operators, and the like.

When the developer needs to input a character of a certain type in the code input interface, a keyboard interface including the character of this type is first displayed in the code input interface. The developer selects the required character from the keyboard interface, and the terminal may detect a selection operation on the character and input the character to the cursor location. When the developer needs to input a character of another type in the code input interface, a switch option in the keyboard interface is triggered. The terminal detects a trigger operation on the switch option, and switches to a keyboard interface including the character of the another type. The developer selects the required character from the keyboard interface, and the terminal may detect a selection operation on the character and input the character to the cursor location.

The trigger operation may be a tap operation, a double-tap operation, a touch and hold operation, or another operation.

In this embodiment of this disclosure, after the developer inputs code in the code input interface, the terminal may acquire the code inputted in the code input interface, and perform a subsequent operation according to the inputted code.

That the terminal acquires the code inputted in the code input interface may include any one of step 3011 to step 3013.

3011. The terminal detects a total quantity of characters of the code inputted in the code input interface, and acquires the code inputted in the code input interface when the total quantity of characters changes.

For example, the total quantity of characters of the code inputted in the current code input interface is 1000. Then, when the total quantity of characters of the code inputted in the code input interface is changed to 999, it indicates that a character in the code input interface changes, and the terminal acquires the code inputted in the code input interface.

3012. The terminal acquires, at intervals of preset duration, the code inputted in the code input interface. The preset duration may be one minute, two minutes, or the like.

3013. The terminal detects a total quantity of characters of the code inputted in the code input interface, and acquires the code inputted in the code input interface when a difference between the total quantity of characters and a total quantity of characters of the previously acquired code in the code input interface is not less than a preset value.

The preset value may be 5, 10, 20, or another value.

For example, if the preset value is 5, and the terminal detects that the total quantity of characters of the code inputted in the code input interface is 1000, when the terminal detects that the total quantity of characters of the code inputted in the code input interface is 997, the difference is 3 and is less than 5, and the terminal will not acquire the code inputted in the code input interface. When the terminal detects that the total quantity of characters of the code inputted in the code input interface is 990, the difference is 10 and is greater than 5, and the terminal acquires the code inputted in the code input interface.

302. Convert the Code Inputted in the Code Input Interface into a Syntax Tree.

The terminal determines a plurality of nodes according to a syntactic structure of the code inputted in the code input interface, determines that the plurality of nodes have a hierarchical relationship, and constructs the syntax tree of the code inputted in the code input interface according to the hierarchical relationship between the plurality of nodes, so as to convert the code inputted in the code input interface into a syntax tree and complete construction of the syntax tree.

The syntax tree may be an abstract syntax tree, or may be another type of syntax tree. In addition, the syntax tree includes a plurality of nodes, a hierarchical relationship between the plurality of nodes, and location intervals of the plurality of nodes, the plurality of nodes and the hierarchical relationship between the plurality of nodes are used for indicating a syntactic structure of the code, and the location interval of the node is used for indicating a location interval of a character set corresponding to the node in the code input interface.

The location interval includes a start location and an end location of the character set corresponding to the node. In addition, the start location is represented by a location, in the code, of a start character in the character set corresponding to the node, and the end location is represented by a location, in the code, of an end character in the character set.

In an exemplarily implementation, a total quantity of characters before the start character is used as the start location of the location interval, and a total quantity of characters before the end character is used as the end location of the location interval.

For example, the code of the syntax tree structure is as follows:

```
- id: Identifier {
    type: "Identifier"
    start: 183
    end: 187
    name: "tips"
  }
```

A character set corresponding to a node "identifier" is "tips", a start location corresponding to the node is 183, and an end location corresponding to the node is 187.

The terminal converts the code inputted in the code input interface into a syntax tree, and uses the syntax tree to express the syntactic structure of the code in a tree form. The syntax tree is generated for the terminal to identify, so that subsequently the terminal may perform an operation of recommending a character according to the generated syntax tree.

In an exemplarily implementation, after the code inputted in the code input interface is acquired, morphology parsing is performed on characters included in the code to divide the characters in the code into words, a plurality of nodes are determined according to the divided words, then syntax parsing is performed on the divided nodes to obtain a hierarchical relationship between a plurality of character sets corresponding to the nodes, and a syntax tree of the code is constructed according to the hierarchical relationship between the plurality of character sets, and the syntactic structure of the code is represented by using the syntax tree.

The morphology parsing indicates that characters included in code are divided into words, and in the morphology parsing process of the code, the characters in the code are successively read, and the code is divided according to language specifications of the current code, to obtain a plurality of divided words. The syntax parsing indicates that syntax parsing is performed on divided nodes to determine a hierarchical relationship between a plurality of nodes.

In this embodiment of this disclosure, code in a code input interface is converted into a syntax tree, so that a terminal may identify the converted syntax tree, determine a syntactic structure of the code according to the syntax tree, and subsequently recommend a character according to the syntactic structure represented by the syntax tree.

303. Traverse Nodes in the Syntax Tree.

304. Determine, when a Cursor Location Belongs to a Location Interval of a Currently Traversed Node, the Node as a Reference Node.

When the terminal subsequently recommends a character, the terminal deduces, according to a cursor location in a current code input interface, a character that is to be inputted to the cursor location. Therefore, the cursor location is determined in the code input interface, a node that is in the syntax tree and whose location interval includes the cursor location is determined from a plurality of nodes in the syntax tree, and the node is determined as a reference node. Subsequently, a to-be-recommended target character may be determined according to the reference node.

Each node in the syntax tree includes a location interval. The terminal traverses each node in the syntax tree according to the cursor location in the code input interface and the syntax tree, and determines at least one reference node corresponding to the cursor location in the syntax tree according to the cursor location and the location interval of each node in the syntax tree.

The syntax tree includes a plurality of nodes, and the plurality of nodes include operator nodes, identifier nodes, or other types of nodes. Therefore, the at least one reference node may also include at least one of an operator node, an identifier node, or another type of node.

In this embodiment of this disclosure, traversal refers to accessing each node in the syntax tree according to a rule, and each node is accessed only once.

In an exemplarily implementation, the foregoing rule may be pre-order traversal, in-order traversal, post-order traversal, or another traversal.

The pre-order traversal refers to successively traversing each node in the syntax tree in order from top to bottom and from left to right of the syntax tree. The in-order traversal refers to successively traversing each node in the syntax tree in order from left to right of the syntax tree. The post-order traversal refers to successively traversing each node in the syntax tree in order from right to left of the syntax tree.

In the process of traversing the nodes included in the syntax tree, the terminal acquires the current cursor location from the code input interface, compares the cursor location with a location interval of each node, and determines whether the cursor location belongs to a location interval of a traversed node. When the cursor location belongs to the location interval of the traversed node, the terminal determines the node as a reference node.

The location interval includes a start location and an end location. Then, when the cursor location is not less than a start location of a location interval of a node in the syntax tree, and the cursor location is not greater than an end location of the location interval of the node, the node is used as a reference node.

In an exemplarily implementation, the cursor location is represented by using a total quantity of characters before the cursor. A start location of the node is represented by a total quantity of characters before a start character corresponding to the node, and an end location of the node is represented by a total quantity of characters before an end character corresponding to the node.

Therefore, when the total quantity of characters before the cursor is not less than the total quantity of characters before the start character corresponding to the node, and the total quantity of characters before the cursor is not greater than the total quantity of characters before the end character corresponding to the node, it is determined that the cursor location belongs to the location interval of the node, and the node is used as a reference node.

In this embodiment of this disclosure, whether the cursor location belongs to a location interval of a node in the syntax tree is determined, so as to determine whether the node in the syntax tree is a reference node, and subsequently, a to-be-recommended character may be determined according to the determined reference node. Determining a to-be-recommended character according to a cursor location improves accuracy of the to-be-recommended character.

305. Parse at Least One Reference Node, and Determine a To-Be-Recommended Target Character According to a Parsing Result.

Step 305 includes any one of step 3051 to step 3053:

3051. Determine an operator node in the at least one reference node and an operation type corresponding to the operator node, and acquire an operator of the operation type from an operator database as a target character.

In this embodiment of this disclosure, an operator node may be further set, and the operator node is a node that is in the syntax tree and that is used for indicating that a character set corresponding to the node includes an operator. In addition, the operator node is a preset operator node. The operator node may be set by the developer, or may be set by the terminal.

The at least one determined reference node is separately compared with the operator node. When the at least one reference node includes the same reference node as the operator node, the reference node may be determined as an operator node. The operator node indicates an operation type corresponding to a corresponding character set. An operation type of the operator node is acquired, an operator of the operation type of the operator node is acquired from the operator database as a target character.

The operator node refers to a node whose corresponding character set includes an operator.

For example, the at least one reference node includes a program node, a variable declaration node, and a name node. The variable declaration node is an operator node. In this case, "+", "( )", and "=" that belong to the variable declaration node are acquired, and the acquired operators are used as target characters.

The operator database is used for storing an operator of at least one operation type. The operator database is stored in the terminal. Alternatively, the operator database is stored in a server. When the terminal parses the at least one reference node, the terminal transmits an operator acquiring request to the server. After receiving the operator acquiring request, the server transmits an operator that is stored in the operator database and that is of at least one operation type to the terminal.

3052. Connect the at least one reference node to form a node path according to a sequence of location intervals of the at least one reference node, parse the node path, determine an operation type of the node path according to a parsing result, and acquire at least one operator of the operation type from an operator database as a target character.

In an exemplarily implementation, if the at least one determined reference node includes a plurality of reference nodes, a start location of each reference node in the plurality of reference nodes is acquired, the plurality of reference nodes are connected to form a node path according to a sorting sequence of the start locations of the plurality of reference nodes, a parsing result is obtained by parsing the node path, and an operation type of the node path is determined according to the parsing result, and at least one operator of the operation type is acquired from the operator database as a target character.

The start location of the reference node is also referred to as a left location of the reference node, and the plurality of reference nodes may be sorted by using left locations of the plurality of reference nodes to form the node path.

When the node path is parsed, the operation type of the node path is determined by parsing each node in the node path and comprehensively considering a relationship between the nodes, and then at least one operator of the operation type is acquired according to the operation type subsequently.

For example, after the node path is determined according to the sequence of the location intervals of the plurality of reference nodes, parsing is started according to a sequence from a start location to an end location of the node path to determine an operation represented by a character set corresponding to each node in the node path. The node path includes a variable declaration node, and the variable declaration node is followed by an identifier node and a name node. That is, it indicates that an operation type of the node path is a value assignment operation, "=" that belongs to the value assignment operation is recommended, and the operator is used as a target character.

The operator database is used for storing an operator of at least one operation type. The operator database is stored in the terminal. Alternatively, the operator database is stored in a server. When the terminal parses the determined node path, the terminal transmits an operator acquiring request to the server. After receiving the operator acquiring request, the server transmits an operator that is stored in the operator database and that is of at least one operation type to the terminal.

In both step 3051 and step 3052 provided in this embodiment of this disclosure, a to-be-recommended operator is determined from the operator database according to the at least one reference node. Subsequently, the determined operator may be used as a target character and recommended to a developer. The developer does not need to switch a keyboard interface to input an operator, thereby automatically recommending an operator, simplifying an operation of the developer, reducing operation time, and improving input efficiency.

3053. Determine a character corresponding to the last identifier node in the at least one reference node, acquire an identifier including the character from an identifier database, and use the identifier as a target character.

In this embodiment of this disclosure, an identifier node may be further set, and the identifier node is a node that is in the syntax tree and that is used for indicating that a character set corresponding to the node includes an identifier. In addition, the identifier node is a preset identifier node. The identifier node may be set by the developer, or may be set by the terminal.

The at least one determined reference node is separately compared with the identifier node. When the at least one reference node includes the same reference node as the identifier node, the reference node may be determined as an identifier node. The last identifier node is determined from the at least one reference node, a corresponding character is determined according to the last identifier node, an identifier including the character is acquired from the identifier database, and the identifier is used as a target character.

In an exemplarily implementation, the last identifier node is determined from the at least one reference node, a character corresponding to the identifier node is determined, a character set that uses the character as a start character is acquired from the identifier database, and the character set is used as a target character.

For example, the character corresponding to the identifier node is "ab", and a character set included in the identifier database is "abcd". "abcd" is a character set that uses "ab" as a start character, and therefore, "abcd" is used as a target character.

In another exemplarily implementation, the last identifier node is determined from the at least one reference node, a corresponding character is determined according to the last identifier node, a character set including the character is acquired from the identifier database, and a character in the character set is used as a target character.

For example, the character corresponding to the identifier node is "ab", and characters included in the identifier database are "cabd" and "abcd". "cabd" includes a character "ab", and "abcd" also includes a character "ab", and therefore, "cabd" and "abcd" are used as target characters.

The identifier node refers to a node whose corresponding character set is an identifier, and the identifier database is used for storing at least one identifier.

According to step 3053 provided in this embodiment of this disclosure, a to-be recommended character is determined from the identifier database according to the at least one reference node. Subsequently, the determined character may be used as a target character and recommended to the developer, and the developer can implement automatic character complement without manually inputting all characters in a character set, thereby simplifying an operation of the developer, reducing operation time, and improving input efficiency.

Figure 4:
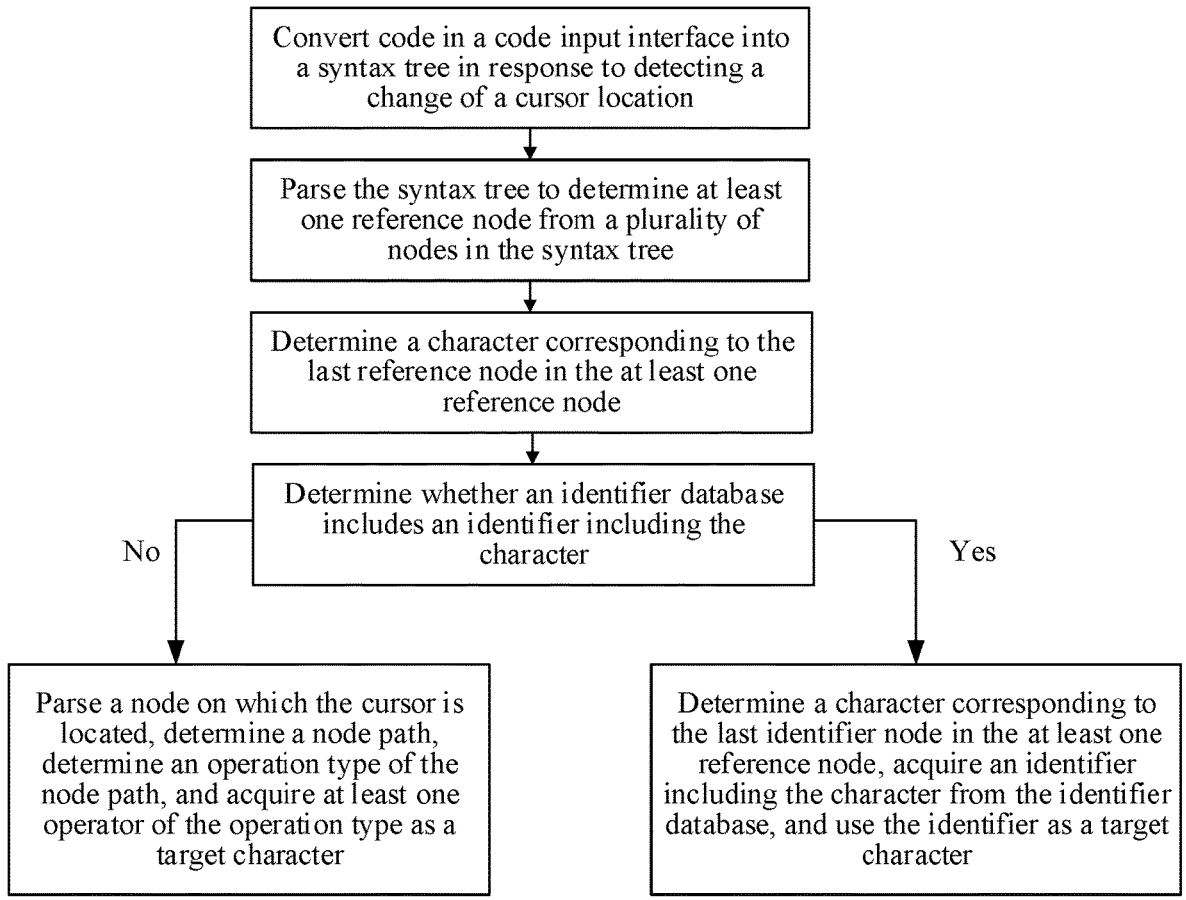
FIG. 4 is a flowchart of a character recommendation method according to an embodiment of this disclosure.

Firstly, at least two of step 3051 to step 3053 may be combined with each other. Before step 3051 to step 3053 are performed, a character corresponding to the last reference node in the at least one reference node is first determined to determine whether the identifier database includes the character; when it is determined that the identifier database includes the character, step 3053 is performed; when it is determined that the identifier database does not include the character, step 3051 or step 3052 is performed. When step 3052 is combined with step 3053, an operation procedure is shown in FIG. 4, and it is determined whether the identifier database includes the character corresponding to the last reference node. Step 3052 is performed if the identifier database includes the character, and step 3053 is performed if the identifier database does not include the character.

Secondly, in step 3053, the identifier being used as the target character is merely used as an example for description. In another embodiment, the last identifier node is determined from the at least one reference node, the character corresponding to the last identifier node is determined. A character set that uses the character as a start character is acquired from the identifier database, and a remaining character in the character set other than the character corresponding to the identifier node is used as a target character.

For example, the character corresponding to the identifier node is "ab", and a character set included in the identifier database is "abcd". "abcd" is a character set that uses "ab" as a start character, and therefore, "cd" is used as a target character.

306. Recommend the Determined Target Character in the Code Input Interface.

After the to-be-recommended target character is determined, the target character may be recommended to the code input interface. The developer does not need to switch the keyboard interface again and input the target character by using the keyboard interface undergone switching.

This embodiment of this disclosure is merely described by using an example in which the terminal performs step 301 to step 305. In another embodiment, step 301 to step 305 may be alternatively performed by the server. After determining at least one target character, the server transmits the at least one target character to the terminal, and the terminal performs step 306.

According to the method provided in this embodiment of this disclosure, code inputted in a code input interface is converted into a syntax tree, at least one reference node corresponding to a cursor location in the syntax tree is determined according to the cursor location in the code input interface and the syntax tree, the at least one reference node is parsed, a to-be-recommended target character is determined according to a parsing result, and the target character is recommended in the code input interface. As such, a target character that needs to be inputted subsequently is recommended according to currently inputted code, and a developer does not need to manually input the character. In particular, when the developer needs to switch a character type, a keyboard interface does not need to be switched, thereby facilitating code writing of the developer, simplifying operations, reducing input time, and improving input efficiency.

In addition, according to the method provided in this embodiment of this disclosure, not only an operator may be recommended to the developer, but also characters may be automatically complemented when the developer inputs a start character, thereby simplifying an operation, reducing input time, and improving input efficiency.

On the basis of the foregoing embodiment, step 306 may include the following several exemplary manners.

In a first exemplarily implementation, step 306 may include step 3061: Generate a character recommendation window in the code input interface in response to determining a plurality of to-be-recommended target characters according to the parsing result, and display the plurality of target characters in the character recommendation window.

In response to determining the plurality of to-be-recommended target characters according to the parsing result, the character recommendation window is generated in the code input interface, and the plurality of target characters are displayed in the character recommendation window. Subsequently, the developer may select a required target character from the plurality of target characters displayed in the character recommendation window, and input the required target character to a cursor location.

The character recommendation window is located at an upper layer of the code input interface. The character recommendation window is movable in the code input interface.

In an exemplarily implementation, the character recommendation window may be generated at the cursor location, or the character recommendation window may be generated at another location than the cursor location in the code input interface.

Figure 5:
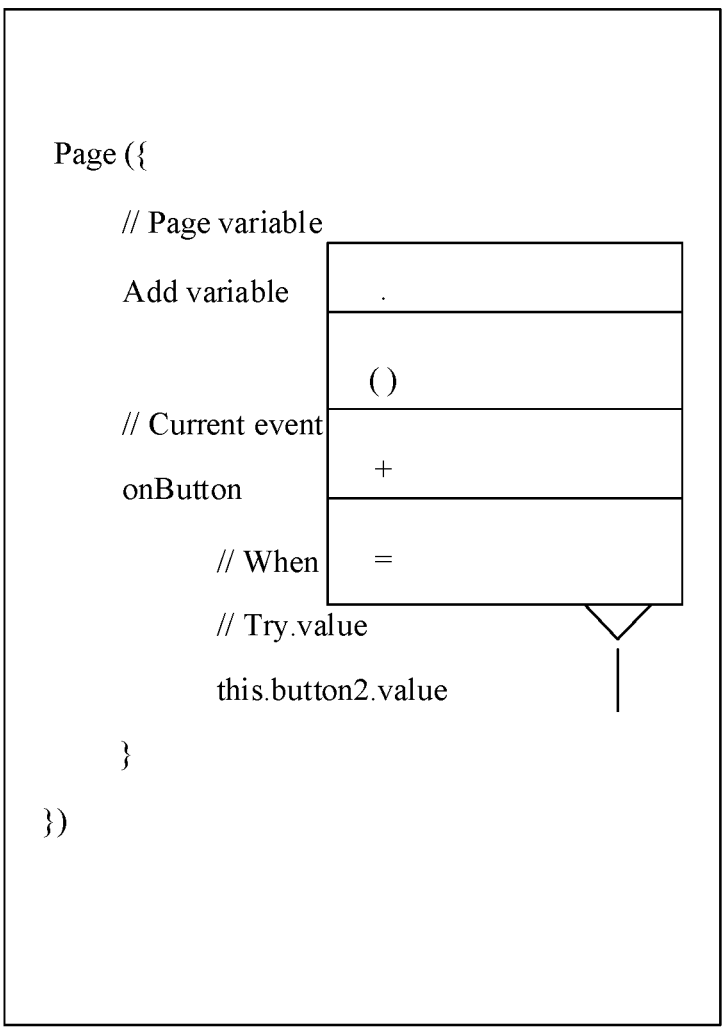
FIG. 5 is a schematic diagram of a character recommendation window according to an embodiment of this disclosure.

For example, as shown in FIG. 5, when the cursor is behind a character set "value", ".", "( )", "+", and "=" may be displayed in the generated character recommendation window.

After step 3061, the method may further include: inputting, in response to detecting a selection operation on a first target character in the plurality of target characters, the selected first target character to the cursor location.

The terminal displays a character recommendation window in a code input interface, and the character recommendation window includes at least one target character. The developer may select the first target character from the at least one target character displayed in the character recommendation window. In response to detecting a selection operation on the first target character, the terminal inputs the selected first target character to the cursor location.

The selection operation may be a tap operation, a double-tap operation, a touch and hold operation, or another operation.

In a second exemplarily implementation, step 306 may include step 3062: Input, in response to determining a plurality of to-be-recommended target characters according to the parsing result, a second target character in the plurality of target characters to the cursor location; and generate a character recommendation window in the code input interface, and display another target character than the second target character in the character recommendation window.

In response to determining a plurality of to-be-recommended target characters according to the parsing result, a second target character is first selected from the plurality of target characters, and the second target character is inputted to the cursor location; a character recommendation window is generated in the code input interface, and another target character than the second target character is displayed in the character recommendation window.

For example, when the plurality of determined target characters are respectively A, B, C, and D, A is inputted to the cursor location, and B, C, and D are displayed in the character recommendation window.

After step 3062, the method may further include: replacing, in response to detecting a selection operation on a third target character in the character recommendation window, the second target character with the third target character.

In response to detecting a selection operation on a third target character in the character recommendation window, it is determined that the initially inputted second target character is an incorrect character, and the second target character is replaced with the third target character, thereby inputting a correct target character to the cursor location.

The selection operation may be a tap operation, a double-tap operation, a touch and hold operation, or another operation.

In a third exemplarily implementation, step 306 may include step 3063: Input, in response to determining one to-be-recommended target character according to the parsing result, the target character to the cursor location.

In response to determining one to-be-recommended target character according to the parsing result, in this case, the target character does not need to be displayed to the developer, and the target character may be directly inputted to the cursor location. The developer does not need to select the target character in the code input interface again, thereby facilitating an operation of the developer and improving operation efficiency.

In an exemplarily implementation, in step 3061 and step 3062, the character recommendation window in the code input interface further includes a close option. When the developer does not need to use the plurality of recommended target characters, the developer may trigger the close option. In response to detecting a trigger operation on the close option, the terminal determines that a close instruction is received, and closes the character recommendation window.

In another exemplarily implementation, in step 3061 and step 3062, when the developer does not need to use the plurality of recommended target characters, the developer may trigger a preset operation in a region other than the character recommendation window in the code input interface. In response to detecting the preset operation, the terminal determines that a close instruction is received, and closes the character recommendation window.

The preset operation may be a tap operation, a double-tap operation, a touch and hold operation, or another operation.

In this embodiment of this disclosure, after step 306 is completed, and after the developer selects the target character, the terminal inputs the target character to the cursor location. Subsequently, step 301 to step 306 may further be continuously performed to continue to recommend the target character to the developer. Continuously, after the developer selects the target character, the terminal inputs the target character to the cursor location.

In this embodiment of this disclosure, the determined target character is displayed in the character recommendation window, and in response to detecting a selection operation on the target character, the selected target character is added to the cursor location. The developer may directly select the target character from the character recommendation window, and does not need to switch the keyboard interface to input the target character, thereby simplifying an operation, reducing input time, and improving input efficiency.

In addition, in this embodiment of this disclosure, the target character may alternatively be directly inputted to the cursor location. The developer only needs to detect whether the inputted target character is correct, thereby simplifying an operation of inputting the target character by the developer, reducing input time, and improving input efficiency.

Figure 6:
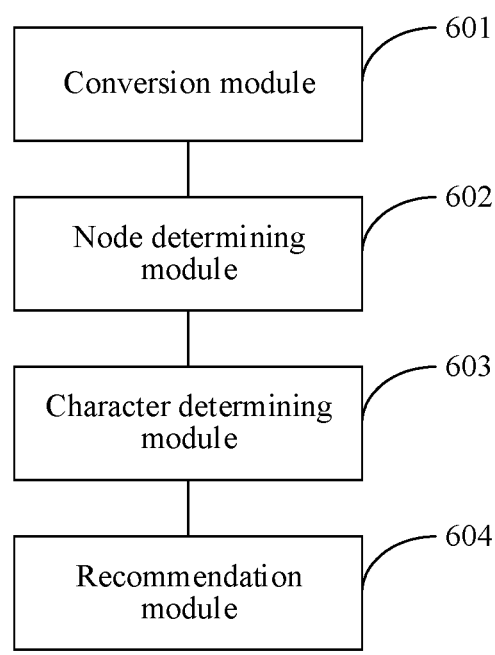
FIG. 6 is a schematic structural diagram of a character recommendation apparatus according to an embodiment of this disclosure.
Figure 7:
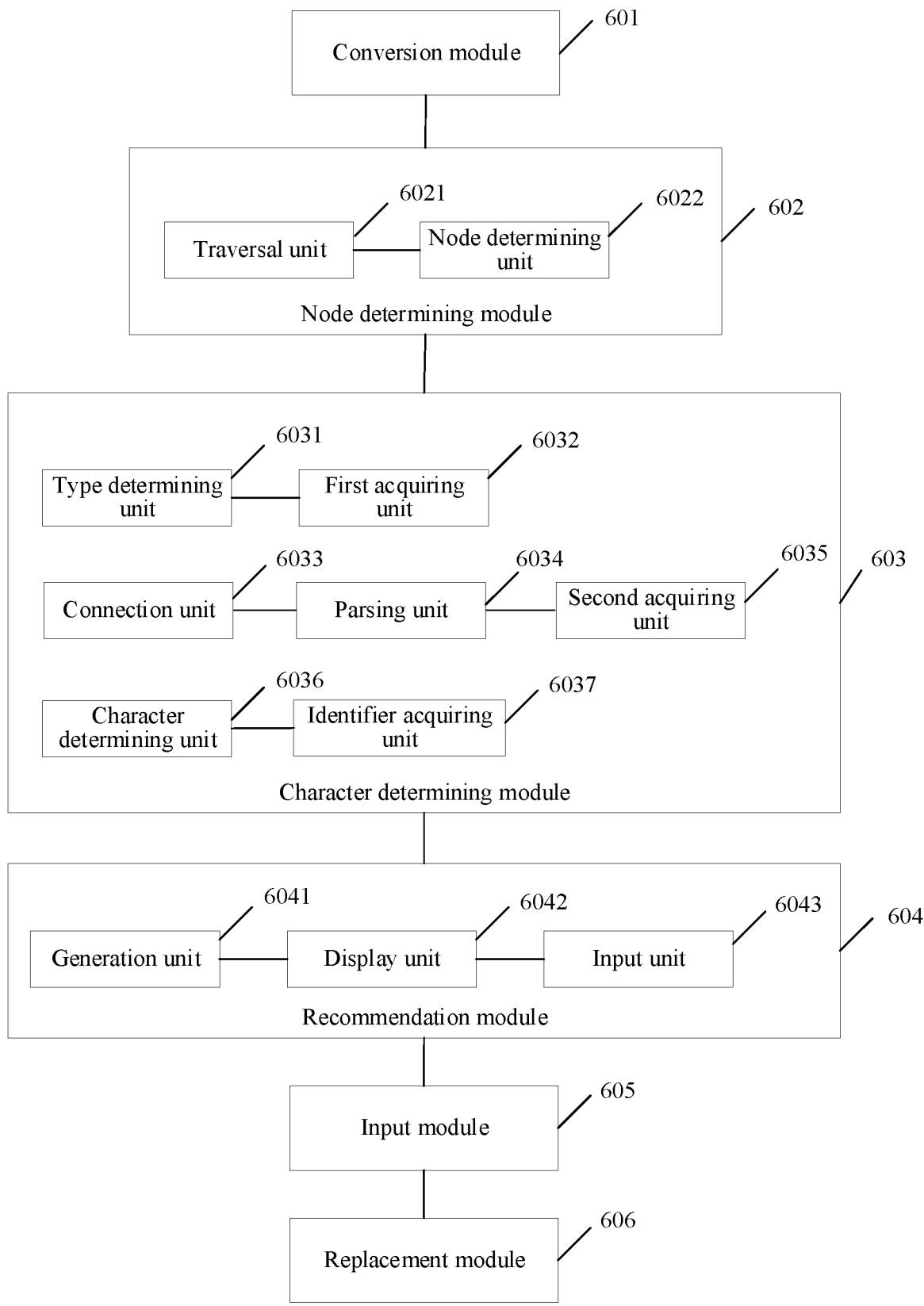
FIG. 7 is a schematic structural diagram of another character recommendation apparatus according to an embodiment of this disclosure.

FIG. 6 is a schematic structural diagram of a character recommendation apparatus according to an embodiment of this disclosure. Referring to FIG. 6, the apparatus includes:

a conversion module 601, configured to convert code inputted in a code input interface into a syntax tree, the syntax tree including a plurality of nodes, a hierarchical relationship between the plurality of nodes, and location intervals of the plurality of nodes, the plurality of nodes and the hierarchical relationship between the plurality of nodes being used for indicating a syntactic structure of the code, and the location interval of the node being used for indicating a location interval of a character set corresponding to the node in the code input interface;

a node determining module 602, configured to determine, according to a cursor location in the code input interface and the syntax tree, at least one reference node corresponding to the cursor location in the syntax tree;

a character determining module 603, configured to: parse the at least one reference node, and determine a to-be-recommended target character according to a parsing result; and a recommendation module 604, configured to recommend the target character in the code input interface.

In an exemplarily implementation, the recommendation module 604 includes:

a generation unit 6041, configured to: generate a character recommendation window in the code input interface in response to determining a plurality of to-be-recommended target characters according to the parsing result; and a display unit 6042, configured to display the plurality of target characters in the character recommendation window.

In another exemplarily implementation, the apparatus further includes:

an input module 605, configured to input, in response to detecting a selection operation on a first target character in the plurality of target characters, the selected first target character to the cursor location.

In another exemplarily implementation, the recommendation module 604 includes:

an input unit 6043, configured to: input, in response to determining one to-be-recommended target character according to the parsing result, the target character to the cursor location.

In another exemplarily implementation, the recommendation module 604 includes:

an input unit 6043, configured to: input, in response to determining a plurality of to-be-recommended target characters according to the parsing result, a second target character in the plurality of target characters to the cursor location;

a generation unit 6041, configured to generate a character recommendation window in the code input interface; and a display unit 6042, configured to display another target character than the second target character in the character recommendation window.

In another exemplarily implementation, the apparatus further includes:

a replacement module 606, configured to replace, in response to detecting a selection operation on a third target character in the character recommendation window, the second target character with the third target character.

In another exemplarily implementation, the node determining module 602 includes:

a traversal unit 6021, configured to traverse nodes in the syntax tree; and a node determining unit 6022, configured to: determine, in a case that a cursor location belongs to a location interval of a currently traversed node, the node as a reference node.

In another exemplarily implementation, the character determining module 603 includes:

a type determining unit 6031, configured to determine an operator node in the at least one reference node and an operation type corresponding to the operator node, the operator node referring to a node whose corresponding character set includes an operator; and a first acquiring unit 6032, configured to acquire an operator of the operation type from an operator database as a target character, the operator database being used for storing an operator of at least one operation type.

In another exemplarily implementation, the character determining module 603 includes:

a connection unit 6033, configured to connect the at least one reference node to form a node path according to a sequence of location intervals of the at least one reference node;

a parsing unit 6034, configured to: parse the node path, and determine an operation type of the node path according to a parsing result; and a second acquiring unit 6035, configured to acquire at least one operator of the operation type from an operator database as a target character, the operator database being used for storing an operator of at least one operation type.

In another exemplarily implementation, the character determining module 603 includes:

a character determining unit 6036, configured to determine a character corresponding to the last identifier node in the at least one reference node, the identifier node referring to a node whose corresponding character set is an identifier; and an identifier acquiring unit 6037, configured to acquire an identifier including the character from an identifier database, and use the identifier as a target character, the identifier database being used for storing at least one identifier.

All of the above-mentioned exemplary technical solutions may be combined randomly to form exemplary embodiments of this disclosure, and details are not described herein again.

When the character recommendation apparatus provided in the foregoing embodiment recommends a character, it is illustrated with an example of division of each functional module. In practical application, the function distribution may be implemented by different functional modules according to requirements, that is, an internal structure of the computer device is divided into different functional modules, to implement all or some of the functions described above. In addition, the character recommendation apparatus and character recommendation method embodiments provided in the foregoing embodiments belong to the same concept. For the specific implementation process, reference may be made to the method embodiment, and details are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 8:
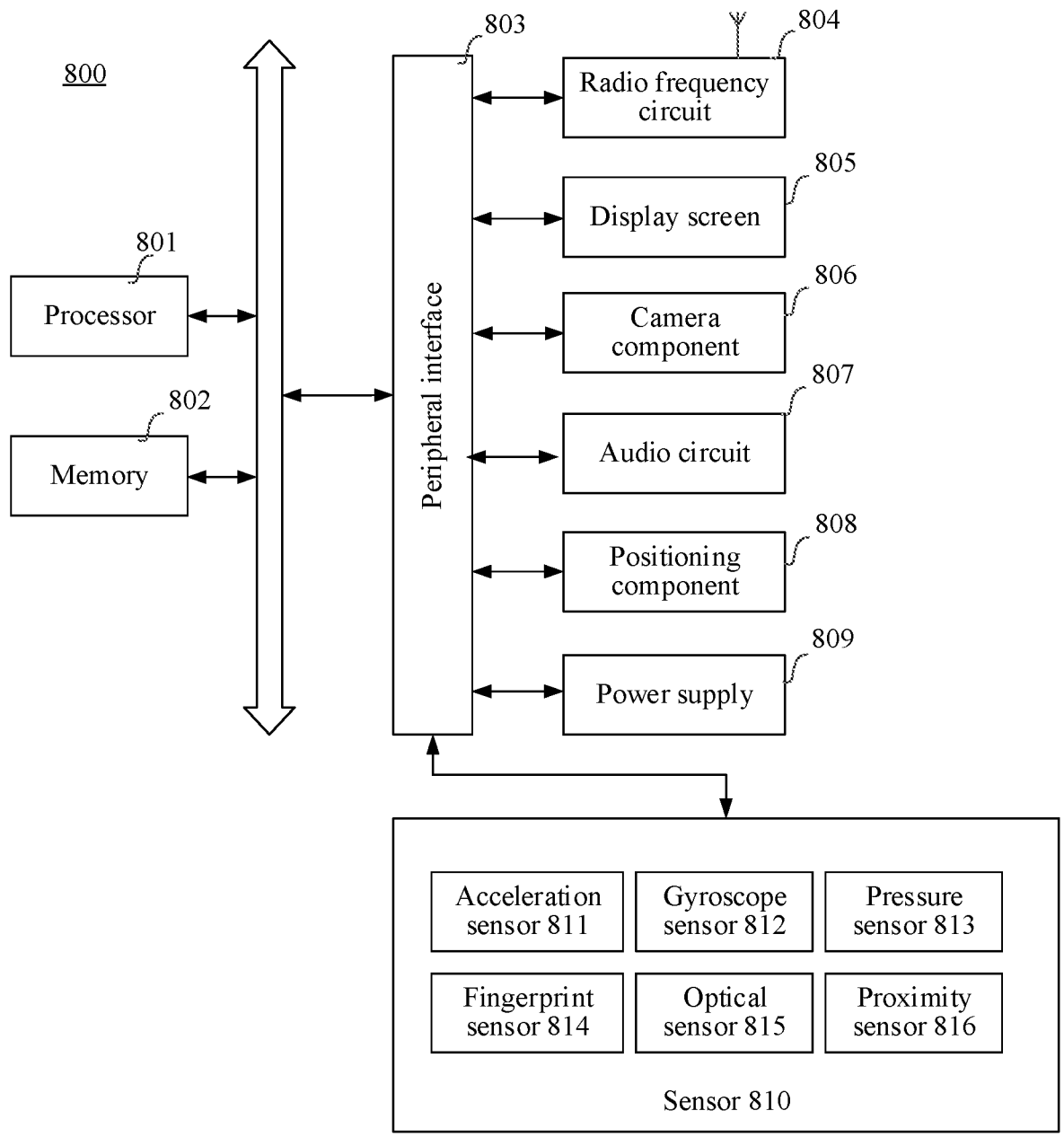
FIG. 8 is a schematic structural diagram of a terminal according to an embodiment of this disclosure.

FIG. 8 is a schematic structural diagram of a terminal according to an embodiment of this disclosure. The terminal 800 may be a portable mobile terminal, for example: a smartphone, a tablet computer, a Moving Picture Experts Group Audio Layer III (MP3) player, a Moving Picture Experts Group Audio Layer IV (MP4) player, a notebook computer, a desktop computer, a head-mounted device, or any another smart terminal. The terminal 800 may also be referred to as user equipment, a portable terminal, a laptop terminal, a desktop terminal, or the like.

Generally, the terminal 800 includes a processor 801 and a memory 802.

The processor 801 may include one or more processing cores. For example, the processor 801 may be a 4-core processor or an 8-core processor. The processor 801 may be implemented in at least one hardware form of a digital signal processor (DSP), a field-programmable gate array (FPGA), and a programmable logic array (PLA). The processor 801 may also include a main processor and a coprocessor. The main processor is a processor configured to process data in an awake state, and is also referred to as a central processing unit (CPU). The coprocessor is a low-power processor configured to process data in a standby state. In some embodiments, the processor 801 may be integrated with a graphics processing unit (GPU). The GPU is configured to render and draw content that needs to be displayed on a display screen. In some embodiments, the processor 801 may further include an artificial intelligence (AI) processor. The AI processor is configured to process a computing operation related to machine learning.

The memory 802 may include one or more computer-readable storage media. The computer-readable storage medium may be non-transient. The memory 802 may further include a high-speed random access memory, and a non-volatile memory such as one or more magnetic disk storage devices or flash storage devices. In some embodiments, the non-transient computer-readable storage medium in the memory 802 is configured to store at least one instruction, and the at least one instruction is used by the processor 801 to implement the character recommendation method provided in the method embodiment of this disclosure.

In some embodiments, the terminal 800 may exemplarily include a peripheral interface 803 and at least one peripheral. The processor 801, the memory 802, and the peripheral interface 803 may be connected by using a bus or a signal cable. Each peripheral may be connected to the peripheral interface 803 by using a bus, a signal cable, or a circuit board. Specifically, the peripheral includes: at least one of a radio frequency (RF) circuit 804, a display screen 805, a camera component 806, an audio circuit 807, a positioning component 808, and a power supply 809.

The peripheral interface 803 may be configured to connect at least one peripheral related to input/output (I/O) to the processor 801 and the memory 802. In some embodiments, the processor 801, the memory 802, and the peripheral interface 803 are integrated on the same chip or circuit board. In some other embodiments, any one or two of the processor 801, the memory 802, and the peripheral interface 803 may be implemented on a single chip or circuit board. This is not limited in this embodiment.

The RF circuit 804 is configured to receive and transmit an RF signal, which is also referred to as an electromagnetic signal. The RF circuit 804 communicates with a communication network and other communication devices through the electromagnetic signal. The RF circuit 804 converts an electrical signal into an electromagnetic signal for transmission, or converts a received electromagnetic signal into an electrical signal. Exemplarily, the RF circuit 804 includes: an antenna system, an RF transceiver, one or more amplifiers, a tuner, an oscillator, a digital signal processor, a codec chip set, a subscriber identity module card, and the like. The RF circuit 804 may communicate with another terminal by using at least one wireless communication protocol. The wireless communication protocol includes, but is not limited to, a metropolitan area network, generations of mobile communication networks (2G, 3G, 4G, and 5G), a wireless local area network, and/or a wireless fidelity (Wi-Fi) network. In some embodiments, the RF circuit 804 may also include a circuit related to near field communication (NFC). This is not limited in this disclosure.

The display screen 805 is configured to display a user interface (UI). The UI may include a graph, text, an icon, a video, and any combination thereof. When the display screen 805 is a touch display screen, the display screen 805 is further capable of collecting touch signals on or above a surface of the display screen 805. The touch signal may be inputted, as a control signal, to the processor 801 for processing. In this case, the display screen 805 may be further configured to provide a virtual button and/or a virtual keyboard, which is also referred to as a soft button and/or a soft keyboard. In some embodiments, there may be one display screen 805 disposed on a front panel of the terminal 800. In some other embodiments, there may be at least two display screens 805 disposed on different surfaces of the terminal 800 or designed in a foldable shape. In still some other embodiments, the display screen 805 may be a flexible display screen disposed on a curved surface or a folded surface of the terminal 800. Even, the display screen 805 may be further set to have a non-rectangular irregular shape, that is, a special-shaped screen. The display screen 805 may be prepared by using materials such as a liquid crystal display (LCD), an organic light-emitting diode (OLED), or the like.

The camera component 806 is configured to collect an image or a video. Exemplarily, the camera component 806 includes a front-facing camera and a rear-facing camera. Generally, the front-facing camera is disposed on a front panel of the terminal, and the rear-facing camera is disposed on a rear surface of the terminal. In some embodiments, there are at least two rear-facing cameras, each being any one of a main camera, a depth of field camera, a wide-angle camera, and a telephoto camera, to implement a background blurring function through fusion of the main camera and the depth of field camera, panoramic photo shooting and virtual reality (VR) shooting functions through fusion of the main camera and the wide-angle camera, or another fusion shooting function. In some embodiments, the camera component 806 may further include a flash. The flash may be a single-color-temperature flash, or may be a double-color-temperature flash. The double-color-temperature flash refers to a combination of a warm-light flash and a cold-light flash, and may be used for light compensation under different color temperatures.

The audio circuit 807 may include a microphone and a speaker. The microphone is configured to acquire sound waves of a user and an environment, and convert the sound waves into electrical signals and input the electrical signals into the processor 801 for processing, or input the electrical signals into the RF circuit 804 to implement voice communication. For a purpose of stereo acquisition or noise reduction, there may be a plurality of microphones disposed at different portions of the terminal 800. The microphone may be further an array microphone or an omnidirectional microphone. The speaker is configured to convert electric signals from the processor 801 or the RF circuit 804 into sound waves. The speaker may be a conventional thin-film speaker or a piezoelectric ceramic speaker. When the speaker is the piezoelectric ceramic speaker, electric signals not only may be converted into sound waves that can be heard by human, but also may be converted into sound waves that cannot be heard by human for ranging and the like. In some embodiments, the audio circuit 807 may also include an earphone jack.

The positioning component 808 is configured to determine a current geographic location of the terminal 800, to implement navigation or a location based service (LBS). The positioning component 808 may be a positioning component based on the Global Positioning System (GPS) of the United States, the BeiDou Navigation Satellite System (BDS) of China, the GLONASS System of Russia, or the GALILEO System of the European Union.

The power supply 809 is configured to supply power to components in the terminal 800. The power supply 809 may be an alternating-current power supply, a direct-current power supply, a disposable battery, or a rechargeable battery. In a case that the power supply 809 includes the rechargeable battery, the rechargeable battery may support wired charging or wireless charging. The rechargeable battery may be further configured to support a fast charge technology.

In some embodiments, the terminal 800 may further include one or more sensors 810. The one or more sensors 810 include, but are not limited to, an acceleration sensor 811, a gyroscope sensor 812, a pressure sensor 813, a fingerprint sensor 814, an optical sensor 815, and a proximity sensor 816.

The acceleration sensor 811 may detect a magnitude of acceleration on three coordinate axes of a coordinate system established with the terminal 800. For example, the acceleration sensor 811 may be configured to detect components of gravity acceleration on the three coordinate axes. The processor 801 may control, according to a gravity acceleration signal collected by the acceleration sensor 811, the display screen 805 to display the UI in a frame view or a portrait view. The acceleration sensor 811 may be further configured to collect data of a game or a user movement.

The gyroscope sensor 812 may detect a body direction and a rotation angle of the terminal 800, and the gyroscope sensor 812 may work with the acceleration sensor 811 to collect a 3D action performed by the user on the terminal 800. The processor 801 may implement the following functions according to the data collected by the gyroscope sensor 812: motion sensing (for example, changing the UI according to a tilt operation of the user), image stabilization during shooting, game control, and inertial navigation.

The pressure sensor 813 may be disposed on a side frame of the terminal 800 and/or a lower layer of the display screen 805. When the pressure sensor 813 is disposed at the side frame of the terminal 800, a holding signal of the user on the terminal 800 may be detected, and the processor 801 performs left/right hand recognition or a quick operation according to the holding signal collected by the pressure sensor 813. When the pressure sensor 813 is disposed on the low layer of the display screen 805, the processor 801 controls, according to a pressure operation of the user on the display screen 805, an operable control on the UI. The operable control includes at least one of a button control, a scroll-bar control, an icon control, and a menu control.

The fingerprint sensor 814 is configured to collect a fingerprint of a user, and the processor 801 identifies the identity of the user according to the fingerprint collected by the fingerprint sensor 814, or the fingerprint sensor 814 identifies the identity of the user according to the collected fingerprint. When the identity of the user is identified as a trusted identity, the processor 801 authorizes the user to perform a related sensitive operation. The sensitive operation includes unlocking a screen, viewing encrypted information, downloading software, payment, changing settings, and the like. The fingerprint sensor 814 may be disposed on a front surface, a rear surface, or a side surface of the terminal 800. When the terminal 800 is provided with a physical button or a vendor logo, the fingerprint sensor 814 may be integrated with the physical button or the vendor logo.

The optical sensor 815 is configured to collect ambient light intensity. In an embodiment, the processor 801 may control display luminance of the display screen 805 according to the ambient light intensity collected by the optical sensor 815. Specifically, when the ambient light intensity is relatively high, the display luminance of the display screen 805 is increased. When the ambient light intensity is relatively low, the display luminance of the display screen 805 is reduced. In another embodiment, the processor 801 may further dynamically adjust a photographing parameter of the camera component 806 according to the ambient light intensity collected by the optical sensor 815.

The proximity sensor 816, also referred to as a distance sensor, is usually disposed on a front panel of the terminal 800. The proximity sensor 816 is configured to collect a distance between a user and the front surface of the terminal 800. In an embodiment, when the proximity sensor 816 detects that the distance between the user and the front surface of the terminal 800 gradually becomes smaller, the display screen 805 is controlled by the processor 801 to switch from a screen-on state to a screen-off state. In a case that the proximity sensor 816 detects that the distance between the user and the front surface of the terminal 800 gradually becomes larger, the display screen 805 is controlled by the processor 801 to switch from the screen-off state to the screen-on state.

A person skilled in the art may understand that the structure shown in FIG. 8 does not constitute a limitation to the terminal 800, and the terminal may include more components or fewer components than those shown in the figure, or some components may be combined, or a different component deployment may be used.

Figure 9:
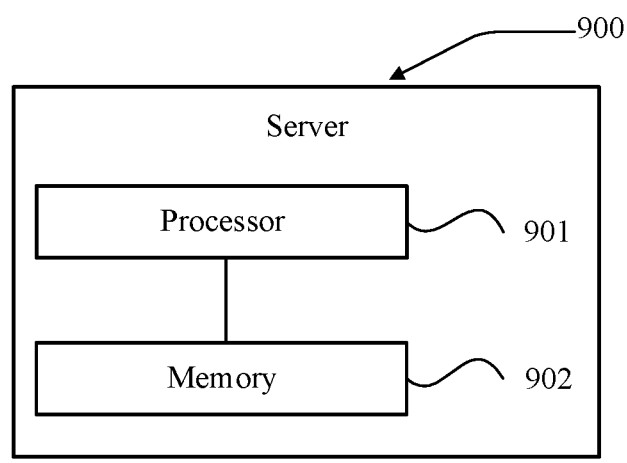
FIG. 9 is a schematic structural diagram of a server according to an embodiment of this disclosure.

FIG. 9 is a schematic structural diagram of a server according to an embodiment of this disclosure. The server 900 may vary greatly due to different configurations or performance, and may include one or more processors (such as central processing units (CPUs)) 901 and one or more memories 902. The memory 902 stores at least one instruction, the at least one instruction being loaded and executed by the processor 901 to implement the methods provided in the foregoing method embodiments. Certainly, the server may also have a wired or wireless network interface, a keyboard, an I/O interface, and other components to facilitate I/O. The server may also include other components for implementing device functions. Details are not described herein again.

The server 900 may be configured to perform the steps performed by the server in the foregoing character recommendation method.

An embodiment of this disclosure further provides a computer device. The computer device includes a processor and a memory, the memory storing an instruction or a program, the instruction or the program being loaded and executed by the processor to implement the following operations:

converting code inputted in a code input interface into a syntax tree, the syntax tree including a plurality of nodes, a hierarchical relationship between the plurality of nodes, and location intervals of the plurality of nodes, the plurality of nodes and the hierarchical relationship between the plurality of nodes being used for indicating a syntactic structure of the code, and the location interval of the node being used for indicating a location interval of a character set corresponding to the node in the code input interface; determining, according to a cursor location in the code input interface and the syntax tree, at least one reference node corresponding to the cursor location in the syntax tree; parsing the at least one reference node, and determining a to-be-recommended target character according to a parsing result; and recommending the target character in the code input interface.

In an exemplarily implementation, the instruction or the program is loaded and executed by the processor to implement the following operation: generating a character recommendation window in the code input interface in response to determining a plurality of to-be-recommended target characters according to the parsing result, and displaying the plurality of target characters in the character recommendation window.

In another exemplarily implementation, the instruction or the program is loaded and executed by the processor to implement the following operation: inputting, in response to detecting a selection operation on a first target character in the plurality of target characters, the selected first target character to the cursor location.

In another exemplarily implementation, the instruction or the program is loaded and executed by the processor to implement the following operation: inputting, in response to determining one to-be-recommended target character according to the parsing result, the target character to the cursor location.

In another exemplarily implementation, the instruction or the program is loaded and executed by the processor to implement the following operations: inputting, in response to determining a plurality of to-be-recommended target characters according to the parsing result, a second target character in the plurality of target characters to the cursor location; and generating a character recommendation window in the code input interface, and displaying another target character than the second target character in the character recommendation window.

In another exemplarily implementation, the instruction or the program is loaded and executed by the processor to implement the following operation: replacing, in response to detecting a selection operation on a third target character in the character recommendation window, the second target character with the third target character.

In another exemplarily implementation, the instruction or the program is loaded and executed by the processor to implement the following operations: traversing nodes in the syntax tree; and determining, in a case that the cursor location belongs to a location interval of a currently traversed node, the node as a reference node.

In another exemplarily implementation, the instruction or the program is loaded and executed by the processor to implement the following operations: determining an operator node in the at least one reference node and an operation type corresponding to the operator node, the operator node referring to a node whose corresponding character set includes an operator; and acquiring an operator of the operation type from an operator database as a target character, the operator database being used for storing an operator of at least one operation type.

In another exemplarily implementation, the instruction or the program is loaded and executed by the processor to implement the following operations: connecting the plurality of reference nodes to form a node path according to a sequence of location intervals of the plurality of reference nodes; parsing the node path, and determining an operation type of the node path according to a parsing result; and acquiring at least one operator of the operation type from an operator database as a target character, the operator database being used for storing an operator of at least one operation type.

In another exemplarily implementation, the instruction or the program is loaded and executed by the processor to implement the following operations: determining a character corresponding to the last identifier node in the at least one reference node, the identifier node referring to a node whose corresponding character set is an identifier; and acquiring an identifier including the character from an identifier database, and using the identifier as a target character, the identifier database being used for storing at least one identifier.

An embodiment of this disclosure further provides a computer-readable storage medium. The computer-readable storage medium stores an instruction or a program. The instruction or the program is loaded and executed by a processor to implement the following operations: converting code inputted in a code input interface into a syntax tree, the syntax tree including a plurality of nodes, a hierarchical relationship between the plurality of nodes, and location intervals of the plurality of nodes, the plurality of nodes and the hierarchical relationship between the plurality of nodes being used for indicating a syntactic structure of the code, and the location interval of the node being used for indicating a location interval of a character set corresponding to the node in the code input interface; determining, according to a cursor location in the code input interface and the syntax tree, at least one reference node corresponding to the cursor location in the syntax tree; parsing the at least one reference node, and determining a to-be-recommended target character according to a parsing result; and recommending the target character in the code input interface.

In an exemplarily implementation, the instruction or the program is loaded and executed by the processor to implement the following operation: generating a character recommendation window in the code input interface in response to determining a plurality of to-be-recommended target characters according to the parsing result, and displaying the plurality of target characters in the character recommendation window.

In another exemplarily implementation, the instruction or the program is loaded and executed by the processor to implement the following operation: inputting, in response to detecting a selection operation on a first target character in the plurality of target characters, the selected first target character to the cursor location.

In another exemplarily implementation, the instruction or the program is loaded and executed by the processor to implement the following operation: inputting, in response to determining one to-be-recommended target character according to the parsing result, the target character to the cursor location.

In another exemplarily implementation, the instruction or the program is loaded and executed by the processor to implement the following operations: inputting, in response to determining a plurality of to-be-recommended target characters according to the parsing result, a second target character in the plurality of target characters to the cursor location; and generating a character recommendation window in the code input interface, and displaying another target character than the second target character in the character recommendation window.

In another exemplarily implementation, the instruction or the program is loaded and executed by the processor to implement the following operation: replacing, in response to detecting a selection operation on a third target character in the character recommendation window, the second target character with the third target character.

In another exemplarily implementation, the instruction or the program is loaded and executed by the processor to implement the following operations: traversing nodes in the syntax tree; and determining, in a case that the cursor location belongs to a location interval of a currently traversed node, the node as a reference node.

In another exemplarily implementation, the instruction or the program is loaded and executed by the processor to implement the following operations: determining an operator node in the at least one reference node and an operation type corresponding to the operator node, the operator node referring to a node whose corresponding character set includes an operator; and acquiring an operator of the operation type from an operator database as a target character, the operator database being used for storing an operator of at least one operation type.

In another exemplarily implementation, the instruction or the program is loaded and executed by the processor to implement the following operations: connecting the plurality of reference nodes to form a node path according to a sequence of location intervals of the plurality of reference nodes; parsing the node path, and determining an operation type of the node path according to a parsing result; and acquiring at least one operator of the operation type from an operator database as a target character, the operator database being used for storing an operator of at least one operation type.

In another exemplarily implementation, the instruction or the program is loaded and executed by the processor to implement the following operations: determining a character corresponding to the last identifier node in the at least one reference node, the identifier node referring to a node whose corresponding character set is an identifier; and acquiring an identifier including the character from an identifier database, and using the identifier as a target character, the identifier database being used for storing at least one identifier.

An embodiment of this disclosure further provides a computer program product. The computer program product includes computer instructions, the computer instructions being stored in a computer-readable storage medium. A processor of a computer device reads the computer instructions from the computer-readable storage medium, and the processor executes the computer instructions, to cause the computer device to implement the following operations:

converting code inputted in a code input interface into a syntax tree, the syntax tree including a plurality of nodes, a hierarchical relationship between the plurality of nodes, and location intervals of the plurality of nodes, the plurality of nodes and the hierarchical relationship between the plurality of nodes being used for indicating a syntactic structure of the code, and the location interval of the node being used for indicating a location interval of a character set corresponding to the node in the code input interface; determining, according to a cursor location in the code input interface and the syntax tree, at least one reference node corresponding to the cursor location in the syntax tree; parsing the at least one reference node, and determining a to-be-recommended target character according to a parsing result; and recommending the target character in the code input interface.

In an exemplarily implementation, the instruction or the program is loaded and executed by the processor to implement the following operation: generating a character recommendation window in the code input interface in response to determining a plurality of to-be-recommended target characters according to the parsing result, and displaying the plurality of target characters in the character recommendation window.

In another exemplarily implementation, the instruction or the program is loaded and executed by the processor to implement the following operation: inputting, in response to detecting a selection operation on a first target character in the plurality of target characters, the selected first target character to the cursor location.

In another exemplarily implementation, the instruction or the program is loaded and executed by the processor to implement the following operation: inputting, in response to determining one to-be-recommended target character according to the parsing result, the target character to the cursor location.

In another exemplarily implementation, the instruction or the program is loaded and executed by the processor to implement the following operations: inputting, in response to determining a plurality of to-be-recommended target characters according to the parsing result, a second target character in the plurality of target characters to the cursor location; and generating a character recommendation window in the code input interface, and displaying another target character than the second target character in the character recommendation window.

In another exemplarily implementation, the instruction or the program is loaded and executed by the processor to implement the following operation: replacing, in response to detecting a selection operation on a third target character in the character recommendation window, the second target character with the third target character.

In another exemplarily implementation, the instruction or the program is loaded and executed by the processor to implement the following operations: traversing nodes in the syntax tree; and determining, in a case that the cursor location belongs to a location interval of a currently traversed node, the node as a reference node.

In another exemplarily implementation, the instruction or the program is loaded and executed by the processor to implement the following operations: determining an operator node in the at least one reference node and an operation type corresponding to the operator node, the operator node referring to a node whose corresponding character set includes an operator; and acquiring an operator of the operation type from an operator database as a target character, the operator database being used for storing an operator of at least one operation type.

In another exemplarily implementation, the instruction or the program is loaded and executed by the processor to implement the following operations: connecting the plurality of reference nodes to form a node path according to a sequence of location intervals of the plurality of reference nodes; parsing the node path, and determining an operation type of the node path according to a parsing result; and acquiring at least one operator of the operation type from an operator database as a target character, the operator database being used for storing an operator of at least one operation type.

In another exemplarily implementation, the instruction or the program is loaded and executed by the processor to implement the following operations: determining a character corresponding to the last identifier node in the at least one reference node, the identifier node referring to a node whose corresponding character set is an identifier; and acquiring an identifier including the character from an identifier database, and using the identifier as a target character, the identifier database being used for storing at least one identifier.

A person of ordinary skill in the art may understand that all or some of the steps of the foregoing embodiments may be implemented by hardware, or may be implemented by a program instructing related hardware. The program may be stored in a computer-readable storage medium. The storage medium may be: a read-only memory (ROM), a magnetic disk, or an optical disc.

The foregoing descriptions are merely exemplary embodiments of this disclosure, but are not intended to limit this disclosure. Any modification, equivalent replacement, or improvement made within the spirit and principle of this disclosure shall fall within the protection scope of this disclosure.

What is claimed is:

1. A character recommendation method for code development, applied to a computer device, comprising:
    converting code received by a code input interface into a syntax tree, the syntax tree comprising:
        a plurality of nodes;
        a hierarchical relationship between the plurality of nodes, the plurality of nodes and the hierarchical relationship between the plurality of nodes being used for indicating a syntactic structure of the code; and
        location intervals of the plurality of nodes, each location interval being used for indicating a location interval of a character set corresponding to a node in the code input interface;
    determining, according to a cursor location in the code input interface and the syntax tree, at least one reference node corresponding to the cursor location in the syntax tree by:
        traversing the plurality of nodes in the syntax tree; and
        determining, when the cursor location belongs to a location interval between a start location and an end location of a currently traversed node, a node corresponding to the location interval of the currently traversed node as a reference node;
    parsing the at least one reference node to obtain a parsing result by determining whether an identifier database includes an identifier having a character corresponding to the at least one reference node;
    determining at least one target character according to the parsing result by:
        when the identifier database includes the identifier of the character corresponding to the at least one reference node, acquiring a target identifier comprising the character from the identifier database to use the target identifier as the at least one target character, the identifier database being used for storing at least one identifier; and
        when the identifier database does not include the identifier of the character corresponding to the at least one reference node, acquiring at least one target operator of a corresponding operation type of an operator node in the at least one reference node from an operator database as the at least one target character, the operator database being used for storing at least one candidate operator of at least one operation type; and
    recommending the at least one target character in the code input interface.

2. The method according to claim 1, wherein recommending the at least one target character in the code input interface comprises:
    generating a character recommendation window in the code input interface after determining a plurality of target characters according to the parsing result; and
    displaying the plurality of target characters in the character recommendation window.

3. The method according to claim 2, wherein after displaying the plurality of target characters in the character recommendation window, the method further comprises:
    inputting, in response to detecting a selection operation on a first target character in the plurality of target characters, the first target character to the cursor location.

4. The method according to claim 1, wherein recommending the at least one target character in the code input interface comprises:
    inputting, after determining the at least one target character according to the parsing result, the at least one target character to the cursor location.

5. The method according to claim 1, wherein recommending the at least one target character in the code input interface comprises:
    inputting, after determining a plurality of target characters according to the parsing result, a second target character to the cursor location; and
    generating a character recommendation window in the code input interface to display, in the character recommendation window, at least one third target character other than the second target character.

6. The method according to claim 5, wherein after generating the character recommendation window in the code input interface to display the at least one third target character, the method further comprises:
    replacing, when detecting a selection operation on the third target character in the character recommendation window, the second target character with the third target character.

7. The method according to claim 1, wherein determining, when the cursor location belongs to the location interval between the start location and the end location of a currently traversed node, the node corresponding to the location interval of the currently traversed node as a reference node comprises:
    determining the cursor location based on a total quantity of characters before the cursor;
    determining the start location based on a total quantity of characters before a start character corresponding to the currently traversed node;
    determining the end location based on a total quantity of characters before an end character corresponding to the currently traversed node; and
    determining the cursor location belongs to the location interval based on the total quantity of characters before the cursor, the total quantity of characters before the start character corresponding to the currently traversed node, and the total quantity of characters before the end character corresponding to the currently traversed node.

8. The method according to claim 1, wherein:
    parsing the at least one reference node to obtain the parsing result further comprises:
        determining the operator node in the at least one reference node and a corresponding operation type of the operator node, the operator node being a node whose corresponding character set comprises an operator.

9. The method according to claim 1, wherein determining whether the identifier database includes the identifier including a character corresponding to the at least one reference node comprises determining whether the identifier database includes the identifier having the character corresponding to the last reference node of the at least one reference node.

10. The method according to claim 1, wherein:
parsing the at least one reference node to obtain a parsing result comprises:
determining the character corresponding to a last identifier node in the at least one reference node, the identifier node being a node whose corresponding character set is an identifier.

11. A computer device, comprising at least one processor and a memory, the memory storing an instruction or a program, the instruction or the program when loaded and executed by the processor, causing the computer device to perform the steps comprising:
converting code received by a code input interface into a syntax tree, the syntax tree comprising:
a plurality of nodes;
a hierarchical relationship between the plurality of nodes, the plurality of nodes and the hierarchical relationship between the plurality of nodes being used for indicating a syntactic structure of the code; and
location intervals of the plurality of nodes, each location interval being used for indicating a location interval of a character set corresponding to a node in the code input interface;
determining, according to a cursor location in the code input interface and the syntax tree, at least one reference node corresponding to the cursor location in the syntax tree by:
traversing the plurality of nodes in the syntax tree; and
determining, when the cursor location belongs to a location interval between a start location and an end location of a currently traversed node, a node corresponding to the location interval of the currently traversed node as a reference node;
parsing the at least one reference node to obtain a parsing result by determining whether an identifier database includes an identifier having a character corresponding to the at least one reference node;
determining at least one target character according to the parsing result, comprising:
when the identifier database includes the identifier of the character corresponding to the at least one reference node, acquiring a target identifier comprising the character from the identifier database to use the target identifier as the at least one target character, the identifier database being used for storing at least one identifier; and
when the identifier database does not include the identifier of the character corresponding to the at least one reference node, acquiring at least one target operator of a corresponding operation type of an operator node in the at least one reference node from an operator database as the at least one target character, the operator database being used for storing at least one candidate operator of at least one operation type; and
recommending the at least one target character in the code input interface.

12. The computer device of claim 11, wherein the instruction or the program, when executed, further causes the computer device to recommend the target character in the code input interface by performing the steps comprising:
generating a character recommendation window in the code input interface after determining a plurality of target characters according to the parsing result; and
displaying the plurality of target characters in the character recommendation window.

13. The computer device of claim 12, wherein the instruction or the program, when executed, further causes the computer device to perform the step comprising:
inputting, in response to detecting a selection operation on a first target character in the plurality of target characters, the first target character to the cursor location.

14. The computer device according to claim 11, wherein the instruction or the program, when executed, further causes the computer device to recommend the at least one target character in the code input interface by performing the step comprising:
inputting, after determining the at least one target character according to the parsing result, the at least one target character to the cursor location.

15. The computer device according to claim 11, wherein the instruction or the program, when executed, further causes the computer device to recommend the at least one target character in the code input interface by performing the steps comprising:
inputting, after determining a plurality of target characters according to the parsing result, a second target character to the cursor location; and
generating a character recommendation window in the code input interface to display, in the character recommendation window, at least one third target character other than the second target character.

16. The computer device according to claim 15, wherein the instruction or the program, when executed, further causes the computer device to perform the step comprising:
replacing, when detecting a selection operation on the third target character in the character recommendation window, the second target character with the third target character.

17. The computer device according to claim 11, wherein the instruction or the program, when executed, further causes the computer device to determine, when the cursor location belongs to the location interval between the start location and the end location of a currently traversed node, the node corresponding to the location interval of the currently traversed node as a reference node by performing the steps comprising:
determining the cursor location based on a total quantity of characters before the cursor;
determining the start location based on a total quantity of characters before a start character corresponding to the currently traversed node;
determining the end location based on a total quantity of characters before an end character corresponding to the currently traversed node; and
determining the cursor location belongs to the location interval based on the total quantity of characters before the cursor, the total quantity of characters before the start character corresponding to the currently traversed node, and the total quantity of characters before the end character corresponding to the currently traversed node.

18. The computer device according to claim 11, wherein the instruction or the program, when executed, further causes the computer device to parse the at least one reference node to obtain the parsing result by performing the step comprising:

determining the operator node in the at least one reference node and a corresponding operation type of the operator node, the operator node being a node whose corresponding character set comprises an operator.

19. The computer device according to claim 11, wherein determining whether the identifier database includes the identifier including a character corresponding to the at least one reference node comprises determining whether the identifier database includes the identifier having the character corresponding to the last reference node of the at least one reference node.

20. A non-transitory computer-readable storage medium, storing an instruction or a program, the instruction or the program, when loaded and executed by a processor of a computer device, causing the computer device to perform the steps, comprising:

converting code received by a code input interface into a syntax tree, the syntax tree comprising:
  a plurality of nodes;
  a hierarchical relationship between the plurality of nodes, the plurality of nodes and the hierarchical relationship between the plurality of nodes being used for indicating a syntactic structure of the code; and
  location intervals of the plurality of nodes, each location interval being used for indicating a location interval of a character set corresponding to a node in the code input interface;

determining, according to a cursor location in the code input interface and the syntax tree, at least one reference node corresponding to the cursor location in the syntax tree by:

traversing the plurality of nodes in the syntax tree; and determining, when the cursor location belongs to a location interval between a start location and an end location of a currently traversed node, a node corresponding to the location interval of the currently traversed node as a reference node;

parsing the at least one reference node to obtain a parsing result by determining whether an identifier database includes an identifier having a character corresponding to the at least one reference node;

determining at least one target character according to the parsing result by:

when the identifier database includes the identifier of the character corresponding to the at least one reference node, acquiring a target identifier comprising the character from the identifier database to use the target identifier as the at least one target character, the identifier database being used for storing at least one identifier; and when the identifier database does not include the identifier of the character corresponding to the at least one reference node, acquiring at least one target operator of a corresponding operation type of an operator node in the at least one reference node from an operator database as the at least one target character, the operator database being used for storing at least one candidate operator of at least one operation type; and recommending the at least one target character in the code input interface.

* * * * *